US008943505B2

(12) United States Patent
Chandhoke

(10) Patent No.: US 8,943,505 B2
(45) Date of Patent: Jan. 27, 2015

(54) HARDWARE ASSISTED REAL-TIME SCHEDULER USING MEMORY MONITORING

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 246 days.

(21) Appl. No.: 13/594,088

(22) Filed: Aug. 24, 2012

(65) Prior Publication Data

US 2014/0059553 A1   Feb. 27, 2014

(51) Int. Cl.
 *G06F 9/46*   (2006.01)
(52) U.S. Cl.
 USPC ............................ 718/100; 718/102; 718/104
(58) Field of Classification Search
 None
 See application file for complete search history.

(56) References Cited

U.S. PATENT DOCUMENTS

| | | | |
|---|---|---|---|
| 7,640,384 B2 | 12/2009 | Hammarlund et al. | |
| 7,730,342 B2* | 6/2010 | Hirano et al. | 714/4.1 |
| 7,873,430 B1* | 1/2011 | Sprecher | 700/100 |
| 8,286,169 B2* | 10/2012 | Zimmer et al. | 718/102 |
| 2006/0288346 A1* | 12/2006 | Santos et al. | 718/102 |
| 2008/0235695 A1* | 9/2008 | Itou | 718/103 |
| 2009/0172679 A1* | 7/2009 | Yoshida et al. | 718/102 |
| 2010/0125851 A1* | 5/2010 | Singh et al. | 718/104 |
| 2012/0030247 A1* | 2/2012 | Yambal et al. | 707/802 |
| 2012/0304182 A1* | 11/2012 | Cho et al. | 718/102 |

OTHER PUBLICATIONS

Gupta et al, "A Hardware Scheduler for Real Time Multiprocessor System on Chip", 2010, IEEE, pp. 264-269.*

Kuacharoen et al., "A Configurable Hardware Scheduler for Real-Time Systems," in Proceedings of the International Conference on Engineering of Reconfigurable Systems and Algorithms, pp. 95-101, Jun. 23-26, 2003. (US).

Kohout et al., "Hardware Support for Real-time Operating Systems," Proceedings of the 1st IEEE/ACM/IFIP International Conference on Hardware/Software Codesign and System Synthesis, Oct. 1-3, 2003. (US).

Agron et al., "FPGA Implementation of a Priority Scheduler Module," Proceedings of the 25th IEEE International Real-Time Systems Symposium, Works in Progress Session (RTSS WIP 2004), Dec. 2004. (US).

Argon et al., "Run-Time Services for Hybrid CPU/FPGA Systems on Chip," Real-Time Systems Symposium, Lawrence: University of Kansas, Dec. 2006. (US).

Intel 64 and IA-32 Architectures Software Developer's Manual: Section 8.10.4 (pp. 2594-2595), May 2012. (US).

* cited by examiner

*Primary Examiner* — Charles Swift
(74) *Attorney, Agent, or Firm* — Meyertons Hood Kivlin Kowert & Goetzel, P.C.; Jeffrey C. Hood; Michael B. Davis

(57) ABSTRACT

Apparatus and method for real-time scheduling. An apparatus includes first and second processing elements and a memory. The second processing element is configured to generate or modify a schedule of one or more tasks, thereby creating a new task schedule, and to write to a specified location in the memory to indicate that the new schedule has been created. The first processing element is configured to monitor for a write to the specified location in the memory and execute one or more tasks in accordance with the new schedule in response to detecting the write to the specified location. The first processing element may be configured to begin executing tasks based on detecting the write without invoking an interrupt service routine. The second processing element may store the new schedule in the memory.

20 Claims, 7 Drawing Sheets

HARDWARE ASSISTED REAL-TIME SCHEDULER USING MEMORY MONITORING

BACKGROUND

1. Technical Field

The present invention relates to the field of processor task scheduling, and more specifically, to a hardware real-time scheduler implementing a memory monitoring methodology.

2. Description of the Related Art

Real-time applications such as video processing applications and embedded control systems and often require high resolution timing and scheduling, which leads to small operation system (OS) timer ticks and greater scheduling overhead for a processor. In other words, a greater portion of processing time is spent determining task schedules rather than processing tasks. Overhead for task scheduling and time management typically increases linearly with system clock frequency.

Therefore, scheduling and time management may be offloaded to hardware such as a coprocessor, field-programmable gate array (FPGA), etc. The offload hardware may calculate/determine task schedules without consuming processor cycles, allowing a processor or central processing unit (CPU) more time to execute currently scheduled tasks. The offload hardware may maintain various implementations of a run queue to efficiently select next schedulable tasks for the CPU. Examples of scheduling policies for run queues include rate monotonic, earliest deadline first, least laxity first, etc., and are beyond the scope of the present disclosure.

Typically, offload hardware provides a next schedule of tasks to a CPU in one of two ways. First, the offload hardware may interrupt the CPU when it determines that it is time to execute a different task on the CPU. Second, the CPU may read from the offload hardware when a CPU timer interrupt fires. In both cases an interrupt service routine typically reads the next schedule from the offload hardware. However, a CPU typically performs a context switch before executing an interrupt service routine, which adds to CPU overhead. Further, servicing an interrupt generally requires other context switches such as loading a new context after exiting an interrupt service routine. Finally, the time interval between a point when an interrupt fires and a point when the interrupt service routine is invoked may vary based on CPU execution state before the context switch.

SUMMARY

The present disclosure relates to a system that is configured to handle task scheduling and time management using a processing element that maintains and provides a real-time schedule using a memory monitoring methodology and not an interrupt-based methodology.

In one embodiment, an apparatus includes first and second processing elements and a memory. The second processing element may be coupled to the memory and may be configured to generate or modify a schedule of one or more tasks, thereby creating a new schedule. The second processing element may be further configured to write to a specified location in the memory, thereby indicating that the new schedule has been created. The first processing element may be configured to monitor for the write to the specified location in the memory and execute one or more tasks in accordance with the new schedule in response to detecting the write to the specified location in the memory.

In some embodiments, the first processing element may be configured to monitor for the write based on a monitor interval specified by the second processing element. In some embodiments, the second processing element is configured to store the new schedule in the memory. The first processing element may be configured to begin to execute the one or more tasks in response to detecting the write without invoking an interrupt service routine.

In another embodiment, a method includes monitoring, by a first processing element, for a write to a specified location in a memory. The method may further include generating or modifying, by a second processing element, a schedule of one or more tasks, thereby creating a new schedule. The method may further include writing, by the second processing element, to the specified location in the memory, thereby indicating that the schedule has been generated or modified. The method may further include detecting, by the first processing element, the write to the specified location in the memory. The method may further include executing, based on said detecting, one or more tasks in accordance with the new schedule.

In various embodiments, using a memory monitoring methodology may result in reduced overhead, reduced non-deterministic behavior, and/or lower power consumption in a processor.

BRIEF DESCRIPTION OF THE DRAWINGS

A better understanding of the present invention can be obtained when the following detailed description of the preferred embodiments is considered in conjunction with the following drawings.

FIG. 1b is a block diagram illustrating a more detailed exemplary embodiment of a system implementing real-time scheduling based on a memory monitoring methodology;

Figure 1A:
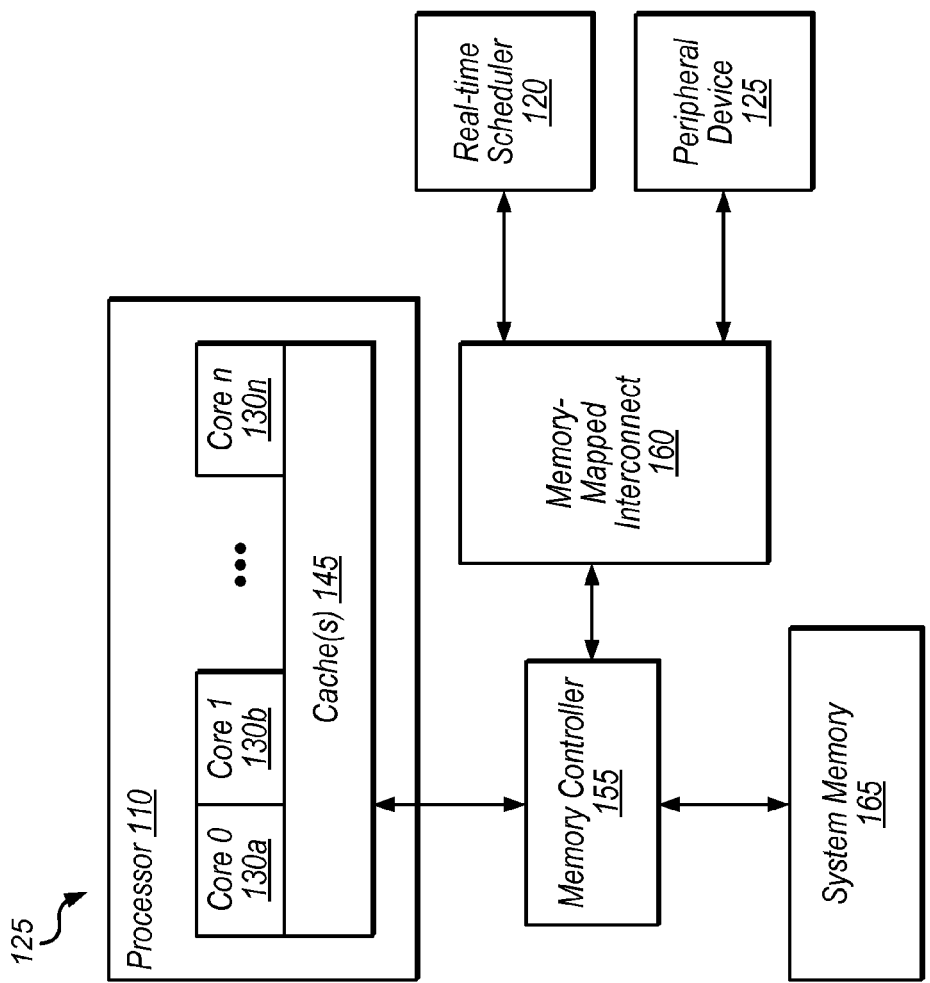
FIG. 1a is a block diagram illustrating one embodiment of a system implementing real-time scheduling based on a memory monitoring methodology.
Figure 1A:
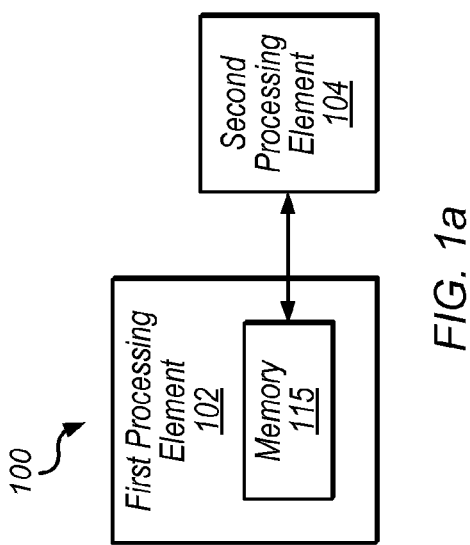

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring now to FIG. 1a, an exemplary system 100 is shown. System 100 includes first processing element 102 which comprises memory 115 in the illustrated embodiment. Memory 115 is coupled to second processing element 104. In various embodiments, memory 115 may reside within first processing element 102 or elsewhere in system 100. Second processing element 104 may generate and maintain a run queue or schedule of tasks for first processing element 102. In one embodiment, first processing element 102 is configured to read the schedule in response to detecting a write by second processing element 104 to a specified location in memory 115. In various embodiments, memory monitoring to detect the write may allow first processing element 102 to obtain a schedule of tasks from second processing element 104 without the context switches typically required by an interrupt-based methodology.

Various units, circuits, or other components may be described or claimed herein as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Referring now to FIG. 1b, one embodiment of a system 125 that supports hardware-assisted real-time scheduling of processor tasks is shown. This embodiment includes processor 110, real-time scheduler 120, peripheral device 125, memory controller 155, memory-mapped interconnect 160, and system memory 165. Real-time scheduler 120 may modify or generate a schedule of tasks for processor 110 and indicate that processor 110 should read a next schedule by writing to a specified location in system memory 165. Processor 110 may read a schedule based on detecting the memory write to the specified location and may execute one or more tasks based on the schedule. Memory controller 155 may be configured to manage transfer of data between cache(s) 145 and system memory 165. Memory-mapped interconnect 160 may be configured to allow peripheral devices to read and/or write to system memory 165. Peripheral device 125 may be one of various peripheral devices and is shown to illustrate that real-time scheduler 120 may be a peripheral device in one embodiment.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

In one embodiment, the elements of FIG. 1b are comprised on the same substrate or chip. In other embodiments, elements of FIG. 1b may be comprised on the same chipset or assembly, but not on the same substrate or chip. In yet other embodiments, elements of FIG. 1b may be connected to other elements through wire or cable couplings.

Processor 110 includes cores 130a-n which are also designated "core 0" through "core n." In various embodiments, processor 110 may include varying numbers of processor cores, such as one, two, eight, or any other suitable number. In the illustrated embodiment, each of cores 120a-n is coupled to cache(s) 145. In another embodiment, each of cores 120a-n may include one or more separate internal caches or a separate portion of a shared cache. Cache(s) 145 may include various internal and/or external caches such as L2 and/or L3 caches in some embodiments. Cache(s) 145 are coupled to memory controller 155, which in turn is coupled to memory-mapped interconnect 160 and system memory 165.

Each of cores 130a-n may be configured to operate independently of the others, such that the cores 130 may execute in parallel. Additionally, in some embodiments, each of cores 130 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 130 may be referred to as a multithreaded core. In some embodiments, one or more of cores 130 are configured to execute tasks in a real-time manner according to a schedule maintained by real-time scheduler 120. Each of cores 130 may include internal instruction caches and/or data caches. In various embodiments, cache(s) 145 may comprise one or more set associative caches and may implement various coherence protocols to maintain coherence among the caches of processor 110.

Memory controller 155 may be configured to manage the transfer of data between cache(s) 145 and system memory 165. In some embodiments, multiple instances of memory interface 130 may be implemented, with each instance configured to control a respective bank of system memory 165. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In one embodiment, memory controller 155 includes a monitoring unit (not shown) that may be configured to monitor for writes to specified locations in system memory 165.

Memory-mapped interconnect 160 is coupled to memory controller 155 and may be configured to allow peripheral devices such as real-time scheduler 120 to read and/or write system memory 165. Memory-mapped interconnect 160 may allow peripheral interfaces to assert control over one or more memory buses in order to read and/or write system memory 165 without using cores 130 to process the reads and/or writes. Memory-mapped interconnect 160 may be configured to implement any suitable protocol or bus standard, such as PCI-EXPRESSO® or Advanced eXtensible Interface (AXI), for example. In various embodiments, memory-mapped interconnect 160 may be any appropriate interconnect that allows peripheral devices to write to a memory without intervention of a processor core. In other embodiments where real-time scheduler 120 is not a peripheral device, various couplings, protocols, and/or standards may be used to interface real-time scheduler 120 to a memory.

Real-time scheduler 120 may modify or generate a schedule of tasks for processor 110. Examples of scheduling policies that may be implemented by real-time scheduler 120 include rate monotonic, earliest deadline first, least laxity first, etc. Tasks may include periodic, sporadic and/or aperiodic tasks and may have hard, soft, and/or firm deadlines. Tasks may display various timing characteristics such as various worst-case execution times, relative deadlines, minimum separation between tasks, periods, etc. Algorithms for scheduling of such tasks are beyond the scope of the present disclosure. Real-time scheduler 120 may implement one of various algorithms in order to schedule tasks.

When real-time scheduler 120 has generated or modified a schedule in order to create a new schedule of tasks, it may write to a pre-determined location in system memory 165 to indicate that the new schedule should be read and executed. In one embodiment, real-time scheduler 120 also stores the new schedule in system memory 165. A core 130 of processor 110 may read the new schedule in response to detecting the write to the pre-determined location in system memory 165 and may execute one or more tasks based on the new schedule.

In one embodiment, real-time scheduler 120 also stores a monitor interval. The monitor interval may be based on characteristics of one or more tasks of the new schedule. For example, the monitor interval may be based at least in part on the number of tasks in the new schedule, on worst-case execution times of tasks, deadlines of tasks, etc. In other embodiments, the monitor interval may be based on characteristics of one or more future tasks that are not tasks of the new schedule. For example, the monitor interval may be based on a calculated start time of a future task, in order to ensure that monitoring for a new schedule begins before the future task should begin execution. In some embodiments, the monitor interval may be based on characteristics of both current and future tasks. In various embodiments, the monitor interval allows processor 110 or elements thereof to determine when to begin monitoring for a memory write by real-time scheduler 120, where the memory write indicates that a new schedule is ready.

In various embodiments, processor 110 may execute instructions of a particular instruction set architecture (ISA) such as INTEL® 64, IA-32, AMD 64®, PowerPC®, or MIPS®, for example. Some ISA's include instructions that allow a logical processor to sleep or perform other tasks while monitoring for a memory write. For example, the INTEL® 64, IA-32, and AMD 64® ISA's include MONITOR and monitor wait (MWAIT) instructions that allow a processor to enter an implementation-dependent optimized state or a sleep state while monitoring for a write to a specified memory address range. In various embodiments, a processor 110 may include a monitor circuit (e.g., in memory controller 155) configured to detect a write to a specified memory address. In some embodiments, the monitor may detect a write while processor 110—or some portion of processor 110—is in a sleep state and may wake processor 110 or a portion thereof from the sleep state in response to detecting the write.

As used herein, the term "detect a write" to a particular location in a memory (or "memory location") may include detecting the address of the particular location on a bus during a write cycle, detecting a change to a value stored at the particular location, and/or detecting a pre-determined value at the particular location. Therefore, detecting a write to a memory location may or may not include reading a value from the memory location. In one embodiment, a monitor circuit (not shown) in memory controller 155 (or elsewhere in processor 110) may monitor for a write to a specified memory location without reading from the memory location, e.g., by monitoring for the address of the particular location on a memory bus. In another embodiment, processor 110 may poll the specified memory location (i.e. by reading from the location periodically) to detect a change in value at the specified location. In yet another embodiment, processor 110 may detect a pre-determined value at a memory location (e.g., that a particular bit at the location is set or cleared) in order to detect a write to the location. In yet another embodiment, processor 110 may detect a change in a cache using a cache coherency methodology in order to detect a write. In various other embodiments, various appropriate methodologies may be used to detect a write to a particular memory location.

Similarly, as used herein, the term "monitor" for a write to a location in memory may or may not include reading from the location. Monitoring may include various methodologies for detecting a write as described above.

In one embodiment (not shown), processor 110 is a microcontroller. In some embodiments, the microcontroller may include a single processing core and no caches, or may include a smaller number of cores and/or caches than shown in FIG. 1*b*. In embodiments where processor 110 is a microcontroller, a memory may reside within the microcontroller or may be coupled to the microcontroller and a scheduler. FIG. 1*b* is intended as exemplary of one embodiment of a processor 110 and various other embodiments may include various processing elements that are not shown and/or exclude various processing elements of FIG. 1*b*.

As used herein, the term "processing element" may refer to a portion or circuit of a processor core, a processor core, a processor, a peripheral device, a hardware programmable device (e.g., a field-programmable gate array), a coprocessor, a system comprising a plurality of processors, etc., that may be configured to execute instructions, or configured to implement functionality of such program instructions, in order to execute one or more tasks and/or generate or modify a schedule of tasks. Thus, in some embodiments, the processor 110 of FIG. 1*b* may be, implement, or include, or may be included in, a first processing element. Similarly, the real-time scheduler of these figures may be, implement, or include, or may be included in, a second processing element.

As used herein, the term "coupled to" may indicate one or more connections between elements, and a coupling may include other intervening elements. For example, in FIG. 1*b*, real-time scheduler 120 may be described as "coupled to" system memory 165 through memory mapped interconnect 160 and memory controller 155. In contrast, in the illustrated embodiment of FIG. 1*b*, real-time scheduler 120 is "directly coupled" to memory mapped interconnect 160 because there are no intervening elements.

In various embodiments described herein, real-time scheduler 120 is described as being configured to write to system memory 165 to indicate that it has generated a new schedule of tasks. In other embodiments, real-time scheduler 120 may write to another memory or cache comprised in processor 110 or elsewhere in order to indicate that it has generated a new schedule of tasks. Additionally, in various embodiments, a memory may be a cache, table, register, flag, bit, indicator, etc. instead of a system memory as described above with reference to FIG. 1*b*.

Figure 2:
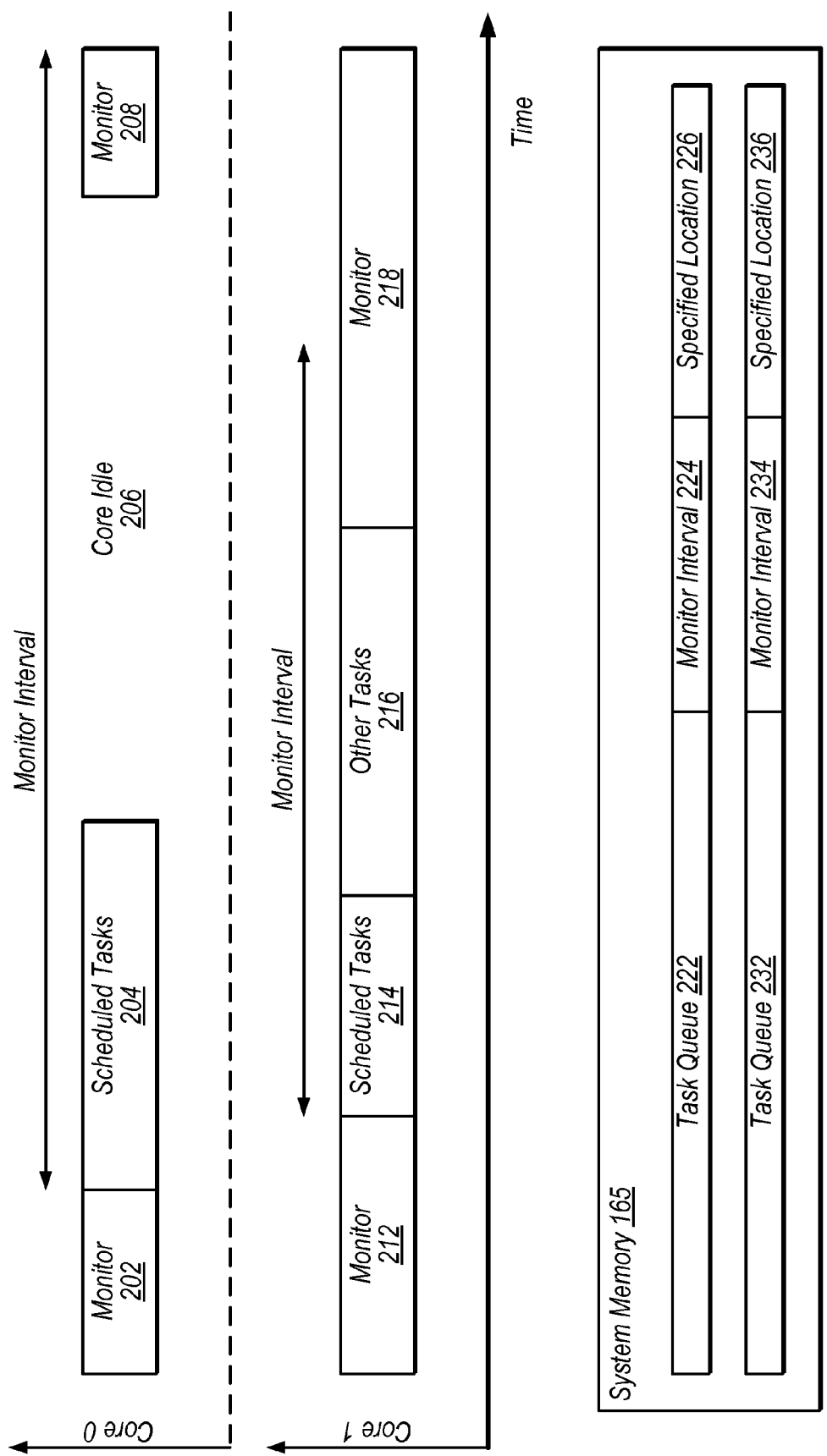
FIG. 2 is a diagram illustrating exemplary execution of scheduled tasks.

Turning now to FIG. 2, a diagram illustrating exemplary execution of scheduled tasks, e.g., by the first processing element, is shown. The diagram of FIG. 2 illustrates the status of a thread of core 0 and a thread of core 1 over a time interval. FIG. 2 also illustrates one embodiment of system memory 165 including entries for task queues 222 and 232, monitor intervals 224 and 234, and specified locations 226 and 236. As previously mentioned, in various embodiments, a processor may include various numbers of cores. Two cores are included in the illustrated embodiment in order to show that different cores may use different monitor intervals. In addition, a particular core may vary its monitor interval based on information from a scheduler. Similarly, different threads within a multithreaded processor core may use different monitor intervals and/or vary their monitor intervals based on information from a scheduler.

In one embodiment, a scheduler such as real-time scheduler 120, e.g., implemented by or on the second processing element, modifies or generates task queues 222 and 232. In the illustrated embodiment, elements 222-226 include information relevant to core 0 and elements 232-236 include information relevant to core 1. For example, core 0 may execute tasks based on task queue 222. After generating a next task schedule for core 0 (e.g., in task queue 222), real-time scheduler 120 may generate monitor interval 224. Monitor interval 224 may be based on information corresponding to the tasks in task queue 222, and/or based on information corresponding to other tasks. Monitor interval 224 may indicate to core 0 that it should begin monitoring for a new schedule before the end of the monitor interval. Real-time scheduler 120 may write to specified location 226 in order to notify core 0 that task queue 222 holds a next schedule of tasks.

In the illustrated example, while monitoring 202 core 0 detects such a write to specified location 226. After detecting the write, core 0 may read monitor interval 224. Based on a monitor interval, a processing element may begin to monitor for a memory write before the end of the monitor interval. For example, in FIG. 2, core 0 begins monitoring 208 before the end of the illustrated monitor interval, in order not to miss a potential write by real-time scheduler 120 indicating a new next schedule. After completing scheduled tasks a core may idle as shown by core idle 206 or execute other tasks. For example, core 1 is shown executing other tasks 216 after completing scheduled tasks 214. Other tasks may include background tasks or other non-scheduled tasks. As illustrated, core 1 may have a different monitor interval than core 0. Further, monitor intervals 224 and 234 may change for each next schedule generated by real-time scheduler 120. In one embodiment, if a core does not detect a write to a specified location after the end of a monitor interval, it continues monitoring until it detects a write to the specified location. For example, as shown in FIG. 2, core 1 continues monitoring 218 after the end of the monitor interval. In other words, the monitor interval defines a point in time by which a core should be monitoring for a write to a specified memory location, but a scheduler may not necessarily write to the specified memory location before the end of the monitor interval.

Figure 3:
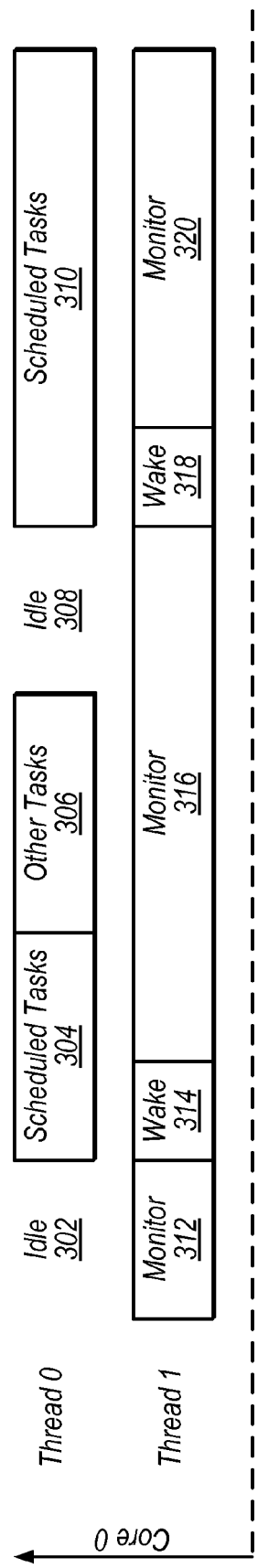
FIG. 3 is a diagram illustrating exemplary execution of scheduled tasks by one processor thread and monitoring by another processor thread.

Turning now to FIG. 3, a diagram illustrating exemplary execution of scheduled tasks (e.g., by the first processing element) is shown. Core 0 of FIG. 3 includes two threads, thread 0 and thread 1. In various embodiments, a core may be configured to execute instructions of varying numbers of threads, including 1, 2, 4, or any other appropriate number. In one embodiment, thread 1 is dedicated to monitoring for a write to one or more specified memory locations. Each of one or more specified memory locations may be used by real-time scheduler 120 to indicate that a task schedule is ready for a particular thread.

In the illustrated embodiment, thread 1 monitors 312 for a write to one or more specified memory locations and wakes 314 when a write is detected. Assume that thread 1 wakes 314 in response to a specified memory location corresponding to thread 0. Thread 1 then invokes task execution on thread 0 based on a next task schedule for thread 0, and thread 0 executes scheduled tasks 304. Thread 0 then goes back to monitoring 316 until it detects another write to the specified memory location and wakes 318 to invoke execution of scheduled tasks 310. In some embodiments, a thread may monitor memory locations corresponding to a plurality of other threads. Similarly, in another embodiment, a processor core may be dedicated to monitoring one or more memory locations and invoke execution of tasks on one or more additional processor cores in response to detecting writes to one or more specified memory locations. For example, with reference to FIG. 1b, core 0 130a may monitor a specified memory location corresponding to core 1 130b and invoke execution of one or more scheduled tasks on core 1 130b in response to detecting a write to the specified memory location.

In one embodiment (not shown), a processor core of a multi-core processor is configured implement a real-time scheduling algorithm and schedule tasks for execution on other processor cores. I.e., rather than offloading scheduling to hardware external to the processor, a processor core may be dedicated to scheduling. Thus, in some embodiments, the second processing element may be or include a processor core. The scheduling core may be configured to write to a specified memory location to indicate that it has generated or modified a new task schedule. Another core may execute one or more tasks according to the new task schedule in response to detecting the write to the specified memory location and thus may be or include the first processing element. In this embodiment, the memory may be a cache, system memory, etc.

Figure 4A:
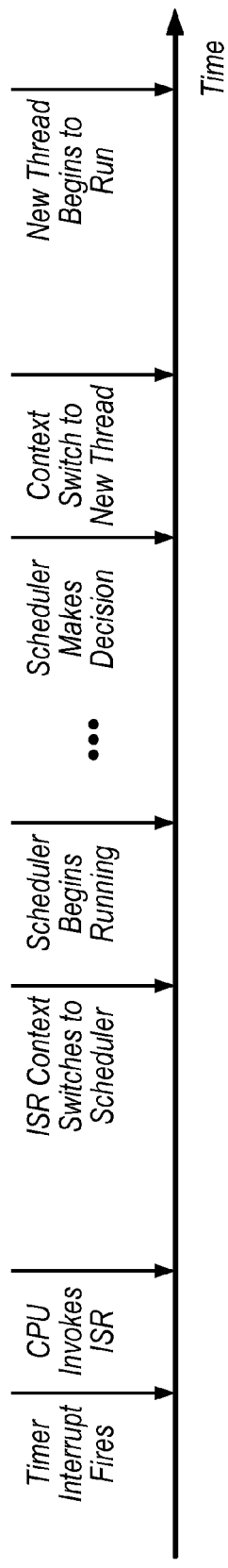
FIGS. 4a through 4c are diagrams illustrating exemplary execution of different scheduling methodologies.
Figure 4B:
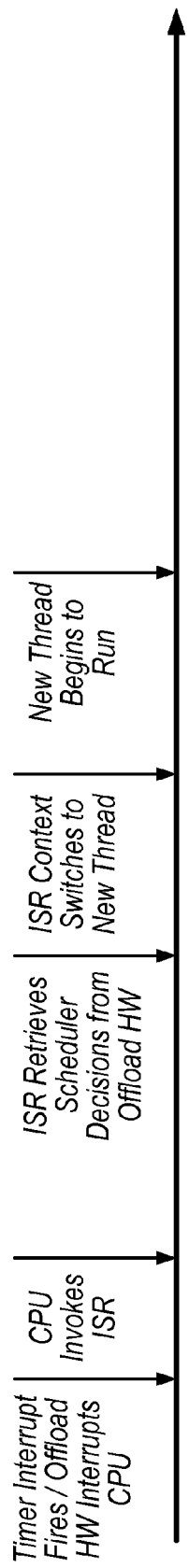
Figure 4C:
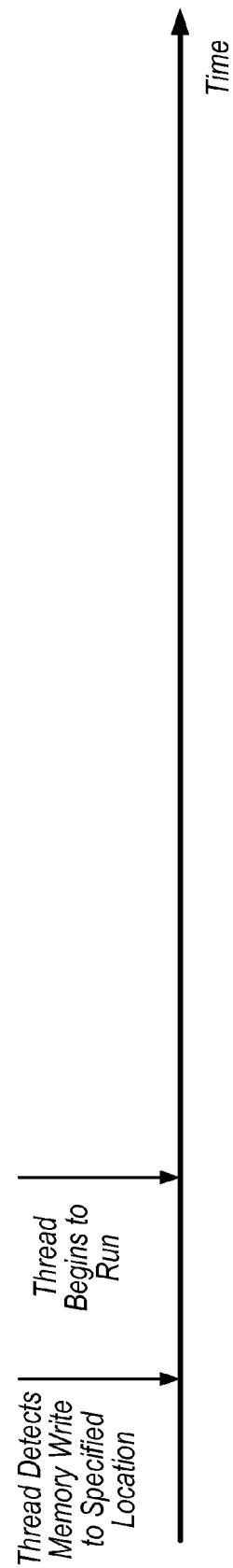

Turning now to FIGS. 4a-4c, a rough comparison of time taken for various scheduling methodologies is shown. FIG. 4a illustrates an exemplary (prior art) methodology where scheduling is performed by the same processing element that executes scheduled tasks. A timer interrupt fires and a CPU saves context then invokes an interrupt service routine (ISR). The interrupt service routine switches context to a scheduler and the scheduler begins running. The CPU executes the scheduler and the scheduler makes a decision (e.g., generating or modifying a schedule of tasks), and context switches to a new thread. The new thread begins to run and may execute tasks as scheduled by the scheduler.

FIG. 4b illustrates an exemplary (prior art) methodology where scheduling is performed by offload hardware (HW) using an interrupt methodology. A CPU timer interrupt may fire or offload HW may interrupt the CPU. The CPU saves context then invokes an ISR. The ISR retrieves scheduler decisions from the offload hardware then switches context to a new thread. The new thread begins to run and may execute tasks as scheduled by the scheduler.

Offload hardware may include various processing elements that are separate from a processing element configured to execute scheduled tasks. For example, offload hardware may be a coprocessor, processor, field-programmable gate array, processor core, etc.

FIG. 4c illustrates an exemplary methodology where scheduling is performed by offload hardware using a memory monitoring methodology, according to one embodiment. A CPU thread detects a memory write to a specified location. Subsequently, a thread begins to run. The thread may execute tasks as scheduled by offload hardware, which may store a next task schedule in the same memory that includes the specified location. As shown by FIGS. 4a-4c, the memory monitoring methodology may reduce processor overhead and eliminate non-deterministic behavior caused by context switches that vary depending on CPU state. In some embodiments, a CPU may sleep or perform background tasks while monitoring for a write to the specified location, which may reduce power consumption and/or increase CPU performance.

Figure 5:
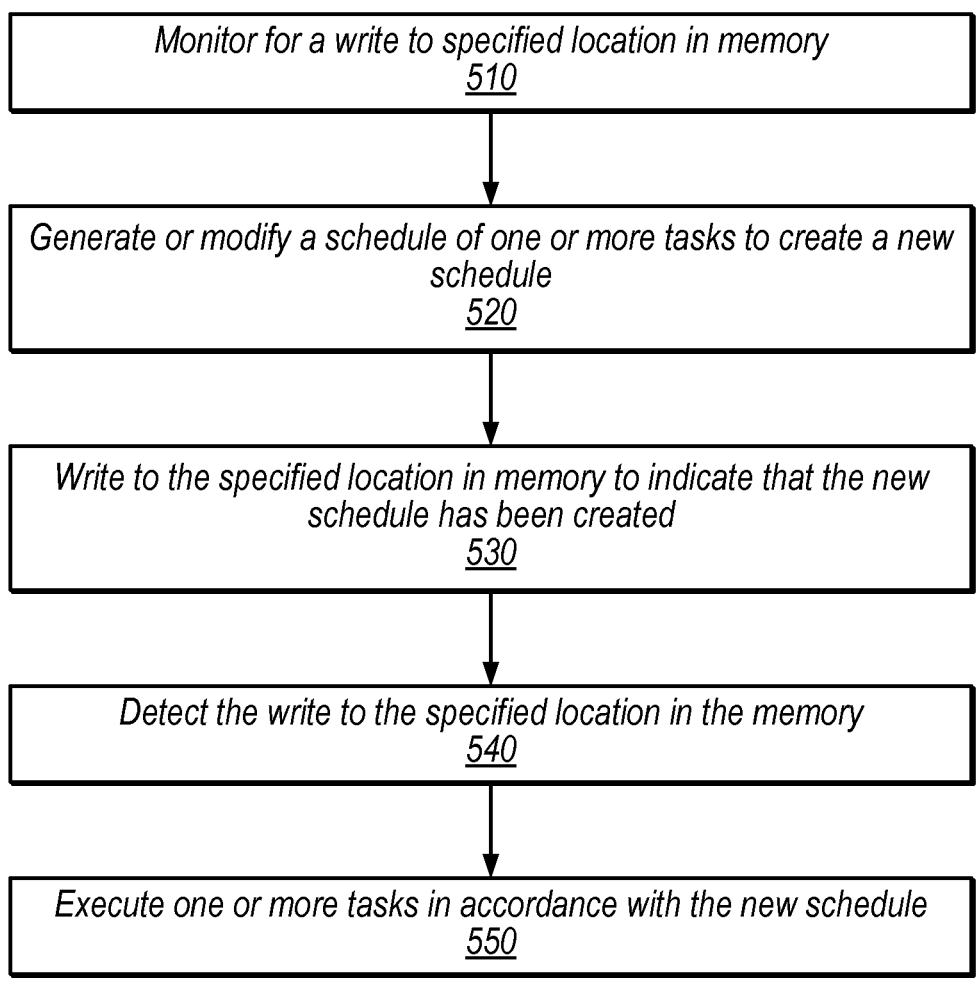
FIG. 5 is a flow diagram illustrating one embodiment of a method for real-time scheduling and execution of tasks.

Turning now to FIG. 5, a flow diagram illustrating one exemplary embodiment of a method 500 for real-time scheduling and execution of tasks is shown. The method shown in FIG. 5 may be used in conjunction with any of the computer systems, devices, or components, disclosed herein, among other devices. In various embodiments, some of the method elements shown may be performed concurrently, in a different order than shown, or may be omitted. Additional method elements may also be performed as desired. As shown, this method may operate as follows. Flow begins at block 510.

At block 510, a specified location in memory is monitored for a write. In one embodiment, thread running on one of cores 130 may execute one or more instructions in order to monitor the specified location. For example, a thread executing instructions of the INTEL® 64 ISA may execute a MONITOR instruction followed by an MWAIT instruction. In another embodiment, a thread may poll the specified location. Flow proceeds to block 520.

At block 520, a schedule of one or more tasks is generated or modified, thereby creating a new schedule. In one embodiment, real-time scheduler 120 generates or modifies the schedule of one or more tasks. Real-time scheduler 120 may store the new schedule in a memory coupled to or included in processor 110 such as system memory 165. Flow proceeds to block 530.

At block 530, a specified location in memory is written, to indicate that the new schedule has been created. In one embodiment, real-time scheduler 120 writes to a pre-determined location in system memory 165. Flow proceeds to block 540.

At block 540, the write to the specified location in the memory is detected. This detecting may be based on the monitoring of block 510 and may be performed using various methods as described above with reference to FIG. 1*b*. Flow proceeds to block 550.

At block 550, one or more tasks are executed in accordance with the new schedule. In one embodiment, a processing element such as core 130*a* may execute the tasks. Tasks may be executed sequentially from the time the processor detects the write to the specified location or may be executed after a delay from the time the processor detects the write or after a particular interval from other tasks in the schedule. Said another way, a processing element may be configured to execute tasks based on various schedule parameters. In some embodiments, real-time scheduler 120 may determine a monitoring period and a processing element may begin monitoring (e.g., the monitoring of block 510) before the monitoring period has elapsed in order to monitor for a write to a specified location indicating a new schedule. In various embodiments, a processing element may begin to execute the one or more tasks based on detecting the write to the specified location in memory without invoking an interrupt service routine. Flow ends at block 550.

Figure 6A:
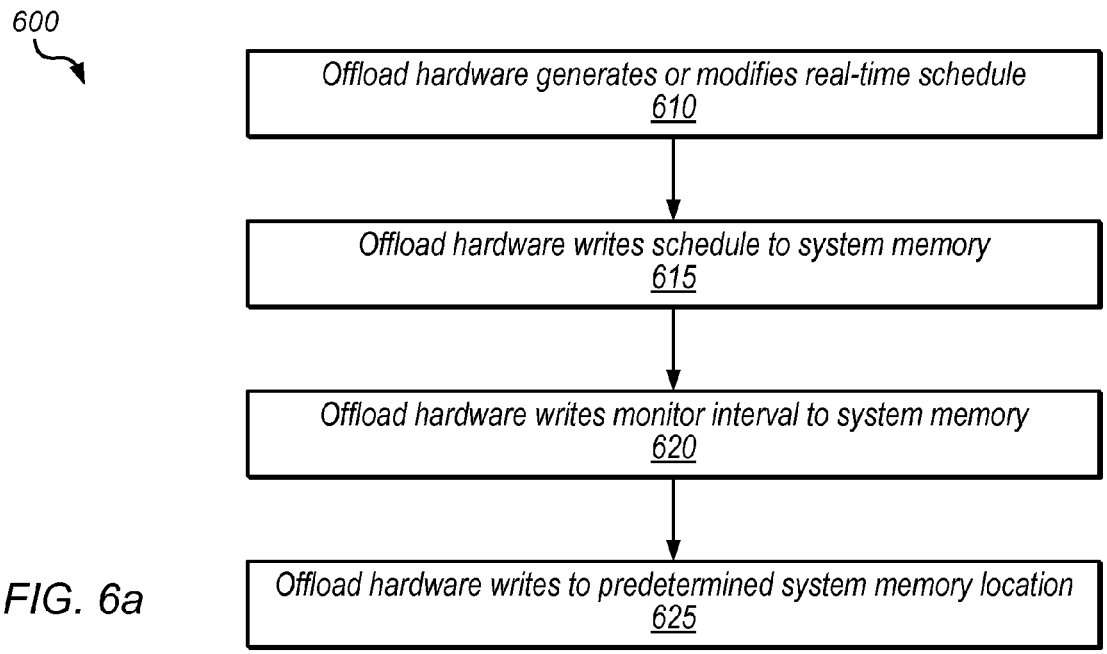
FIG. 6a is a flow diagram illustrating one embodiment of a method for generating a schedule and indicating that the schedule has been generated.

Turning now to FIG. 6*a*, a flow diagram illustrating one particular embodiment of a method 600 for providing a real-time schedule to a processor is shown. Flow begins at block 610.

At block 610, offload hardware, such as real-time scheduler 120 generates or modifies a real-time schedule of tasks (thereby producing a new schedule). Flow proceeds to block 615.

At block 615, the offload hardware writes the schedule to memory, e.g., system memory. Flow proceeds to block 620.

At block 620, the offload hardware writes a monitor interval to system memory. The monitor interval may be based on characteristics of tasks of the real-time schedule and/or characteristics of one or more future tasks. Flow proceeds to block 625.

At block 625, the offload hardware writes to a predetermined memory location, e.g., in system memory, in order to indicate that the schedule has been generated or modified. Flow ends at block 625. Of course, in some embodiments, the above method elements may be performed iteratively, e.g., with successive generations or modifications of task schedules.

Figure 6B:
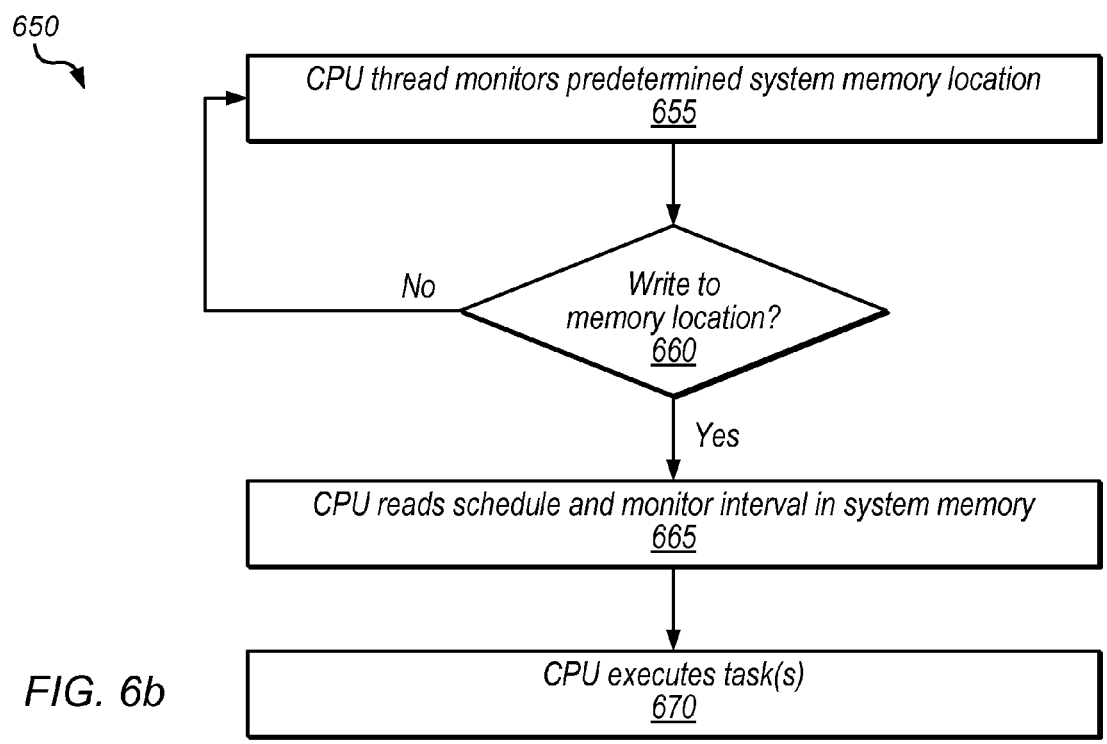
FIG. 6b is a flow diagram illustrating one embodiment of a method for reading a schedule by a processing element.

Turning now to FIG. 6*b*, a flow diagram illustrating one embodiment of a method 650 for obtaining a real-time schedule by a processor (or more generally, a processing element) is shown. Flow begins at block 655.

At block 655, a CPU thread monitors the predetermined system memory location. The predetermined system memory location corresponds to the predetermined memory location of block 625 of FIG. 6*a*, e.g., in system memory. Flow proceeds to decision block 660.

At decision block 660, if a write to the predetermined memory location is detected, flow proceeds to block 665. Otherwise, flow proceeds to block 655, i.e., the CPU thread continues monitoring the location. In some embodiments, the CPU may enter a sleep state or perform non-scheduled or background tasks while monitoring.

At block 665, the CPU reads the real-time schedule and monitor interval from memory (e.g., system memory). The real-time schedule and monitor interval may correspond to the schedule and interval written in blocks 615 and 620 of FIG. 6*a*. Flow proceeds to block 670.

At block 670, the CPU executes one or more tasks as indicated by the real-time schedule. Flow ends at block 670.

A system utilizing the methods 600 and 650 of FIGS. 6*a* and 6*b* may allow real-time scheduling of processor tasks by offload hardware without processing overhead associated with interrupt-based methodologies, e.g., which involve context switches. In some embodiments, a CPU thread that monitors for a write to a predetermined memory location may enter a sleep state while monitoring, which may reduce processor power consumption.

Figure 7:
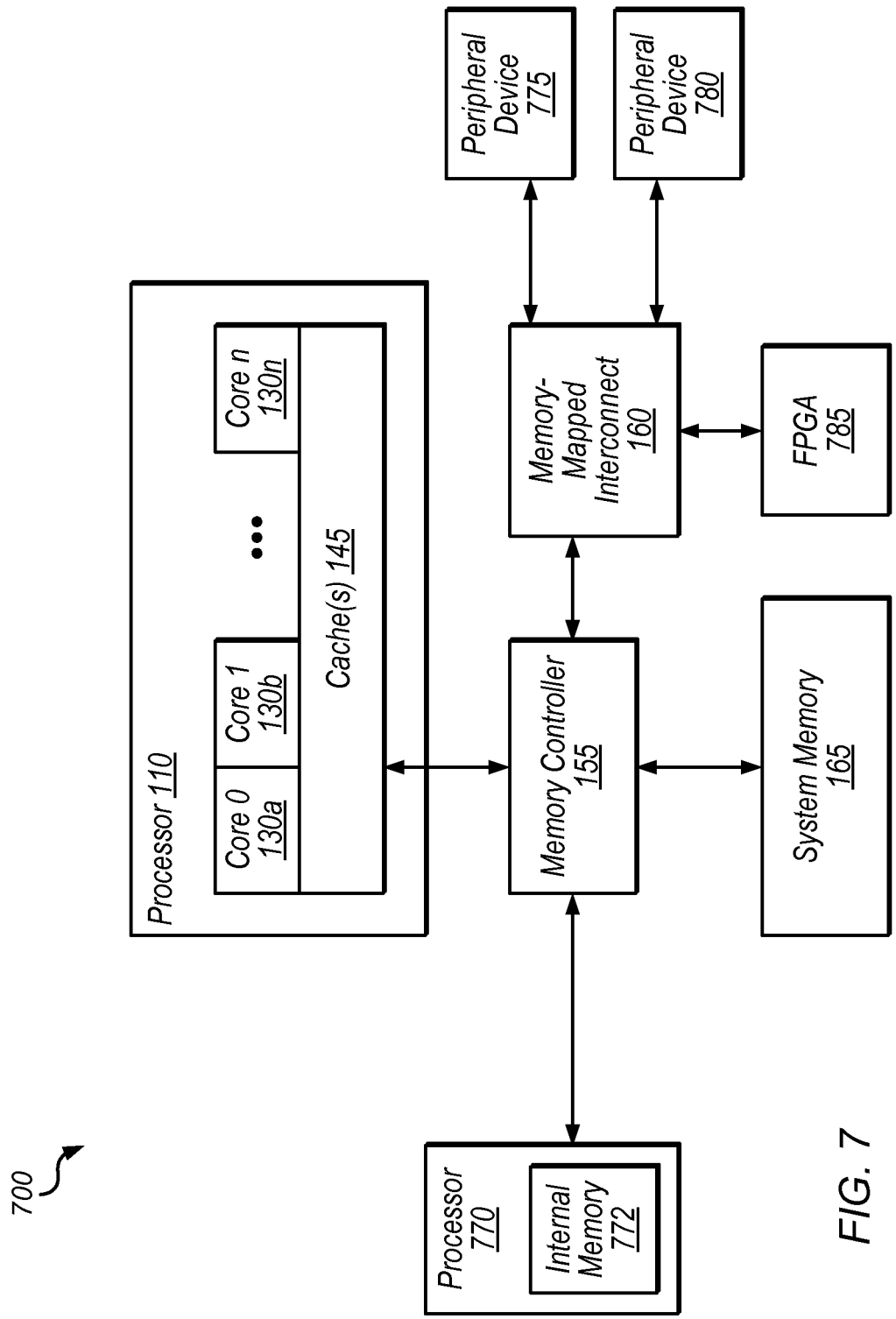
FIG. 7 is a block diagram illustrating an exemplary system embodiment.

Turning now to FIG. 7, an exemplary embodiment of a system 700 is shown. In some embodiments, processor 110, memory controller 155, memory-mapped interconnect 160, and system memory 165 may be configured as described above in reference to corresponding elements of FIG. 1*b*. FIG. 7 also includes processor 770, FPGA 785, and peripheral devices 775 and 780. Note that in different embodiments, various components or combinations of components may be, implement, or include the first and second processing elements discussed above.

In one embodiment, the elements of FIG. 7 are comprised on the same substrate or chip. In other embodiments, some elements of FIG. 7 may be comprised on the same chipset or assembly, but not on the same substrate or chip. In yet other embodiments, some elements of FIG. 7 may be connected to other elements through wire or cable couplings. In various embodiments, various appropriate combinations of couplings, manufacturing processes, etc. may be used to connect the elements of FIG. 7. Some embodiments may also exclude various elements of the exemplary embodiment of FIG. 7.

Exemplary system 700 includes processor 770 which includes internal memory 772. In the illustrated embodiment, processor 770 is coupled to memory controller 155. In other embodiments, processor 770 may be directly coupled to processor 110, e.g., using a processor interconnect such as a QUICKPATH interconnect (QPI) or HYPERTRANSPORT® interconnect, for example. In some embodiments, processor 770 may be configured to generate or modify a real-time schedule of tasks, and thus may be or implement the second processing element. In other embodiments, processor 770 may be configured to execute tasks according to a real-time schedule generated by some other processing element of FIG. 7, and thus may be or implement the first processing element. In some embodiments, internal memory 772 includes a specified memory location that is written to indicate that a new schedule of tasks has been created. In other embodiments, processor 770 may write to a specified location in system memory 165 or detect a write to a specified location in system memory 165 to indicate or detect that a new schedule of tasks has been created. In some embodiments, processor 770 is a coprocessor.

System 700 also includes peripheral devices 775 and 780. In one embodiment, a peripheral device maintains a real-time schedule of tasks for execution by another processing element of FIG. 7, and thus may be or implement the second processing element. In some embodiments, a peripheral device may execute tasks in accordance with a real-time schedule created by another processing element of FIG. 7, and thus may be or implement the first processing element. In some embodiments, processor 110 may comprise or be comprised in a host device for peripheral devices 775 and 780. In one embodiment, peripheral device 775 generates or modifies a schedule of tasks to create a new schedule and writes to a specified location in system memory 165 to indicate that the new schedule has been created. In this embodiment, peripheral device 780 monitors for a write to the specified location and executes one or more tasks in accordance with the new schedule in response to detecting the write to the specified location.

Field-programmable gate array (FPGA) 785 may be configured to maintain a real-time schedule of tasks, and thus may be or implement the second processing element. In other embodiments, FPGA 785 may be replaced with other programmable hardware devices, such as a programmable logic array (PLA), complex programmable logic device (CPLD), some combination of programmable logic devices, etc.

In various embodiments, a memory such as system memory 165 or internal memory 772 may include a specified location that is written to indicate that a next schedule has been created according to a memory monitoring methodology. The memory may be comprised in various elements of system 700, comprised in an element that is not shown in FIG. 7, or may be a stand-alone memory module. In some embodiments, the second processing element may store a schedule of tasks in the memory.

As described above with reference to FIG. 1b, processor 110 may be configured to execute tasks according to a real-time schedule and/or maintain a schedule of real-time tasks. In various embodiments, cores 130 of processor 110 may be configured to execute tasks according to a real-time schedule or maintain a schedule of real-time tasks. FIG. 7 is intended to illustrate various embodiments of processing elements configured to maintain one or more real-time task schedules or execute tasks according to a real-time schedule using a memory monitoring methodology. In various embodiments, various other appropriate processing elements may perform such functionality.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An device, comprising:
   a system memory of the device;
   a first processing element, comprising or coupled to the system memory; and
   a second processing element, coupled to the system memory, and configured to:
      generate or modify a real-time schedule of one or more real-time tasks, thereby creating a new real-time schedule; and
      write to a specified location in the system memory, thereby indicating that the new real-time schedule has been created;
   wherein the first processing element is configured to:
      monitor for a write to the specified location in the system memory; and
      execute the one or more real-time tasks in accordance with the new real-time schedule in response to detecting the write to the specified location in the system memory without invoking an interrupt service routine.

2. The device of claim 1, wherein the first processing element is configured to monitor for a write to the specified location based on a monitor interval specified by the second processing element.

3. The device of claim 1, wherein the second processing element is further configured to store the new real-time schedule in the system memory.

4. The device of claim 1, wherein the second processing element is configured to write to the specified location in the system memory by asserting control over a bus.

5. The device of claim 1,
   wherein the first processing element is a processor core; and
   wherein a thread of the processor core is configured to monitor for the write and to execute the one or more real-time tasks.

6. The device of claim 1, wherein the first processing element is a processor comprising a plurality of cores, wherein a first core is configured to monitor for the write, and wherein a second core is configured to execute the one or more real-time tasks.

7. The device of claim 1, wherein the first processing element is a multithreaded processor, wherein a first processor thread of the multithreaded processor is configured to monitor the specified location in the system memory, and wherein a second processor thread of the multithreaded processor is configured to execute the one or more real-time tasks.

8. The device of claim 1, wherein the second processing element is comprised in a peripheral device of a host device.

9. The device of claim 8, wherein the first processing element is comprised in another peripheral device of the host device.

10. The device of claim 8, wherein the first processing element is comprised in the host device.

11. The device of claim 1, wherein the device comprises a processor, and wherein the first and second processing elements comprise processor cores of the processor.

12. The device of claim 1, wherein the second processing element comprises a coprocessor.

13. The device of claim 1, wherein the second processing element comprises a hardware programmable device.

14. A method, comprising:
- monitoring, by a first processing element of a device, for a write to a specified location in a system memory of the device;
- generating or modifying, by a second processing element of the device, a real-time schedule of one or more real-time tasks, thereby creating a new real-time schedule;
- writing, by the second processing element of the device, to the specified location in the system memory, thereby indicating that the real-time schedule has been generated or modified;
- detecting, by the first processing element of the device, the write to the specified location in the system memory; and
- executing, by the first processing element of the device, based on said detecting, one or more real-time tasks in accordance with the new real-time schedule without invoking an interrupt service routine.

15. The method of claim 14, wherein the first processing element begins said monitoring based on a monitor interval specified by the second processing element.

16. The method of claim 14, further comprising:
- storing the new real-time schedule, by the second processing element, in the system memory.

17. The method of claim 14, wherein said writing comprises asserting control over a bus of the first processing element.

18. The method of claim 14, wherein the second processing element is a coprocessor configured to implement a real-time scheduler and the first processing element is a processor core.

19. The method of claim 14, wherein the first processing element is a processor comprising a plurality of cores, wherein a first core is configured to perform said monitoring, and wherein a second core is configured to perform said executing.

20. The method of claim 14, wherein the first processing element is a multithreaded processor, wherein a first thread of the multithreaded processor performs said monitoring and wherein a second thread of the multithreaded processor performs said executing.

* * * * *